May 7, 1963 R. H. LOOMIS 3,089,135

RANGE TRACK AIDING CIRCUITS

Filed March 3, 1958

INVENTOR
ROBERT H. LOOMIS

BY R. I. Tompkins

ATTORNEYS

United States Patent Office 3,089,135
Patented May 7, 1963

3,089,135
RANGE TRACK AIDING CIRCUITS
Robert H. Loomis, Elkridge, Md., assignor, by mesne assignments, to the United States of America as represented by the Secretary of the Navy
Filed Mar. 3, 1958, Ser. No. 718,931
6 Claims. (Cl. 343—7.3)

The present invention relates to range track aiding circuits and more particularly to range track aiding circuits for eliminating delay in the range track output.

In known fire control systems, the computer which performs the basic fire control computations for the system is designed to provide the necessary noise rejection in the signals other than range signals sent to the pilot, or autopilot, during an attack phase. This rejection is accomplished without introducing a bias error provided the target does not maneuver. However, the computer is not capable of removing a bias error that is already present when the signal enters the computer. If a zero bias error design criterion for the computer is to be met, the signal presented to the computer must not be delayed.

Although the computer is designed to provide delayless filtering, the output of the radar range track unit is heavily filtered and delayed. Since the computer is not capable of removing a lag in its input because of its design and since the computer requires delayless filtering in order to have a zero bias error output, the presence of this lag in the range signal input to the computer is objectionable. Rather than redesign the range track unit which would be costly, the computer and range track unit can be made compatible by coupling a signal already present in the computer as an input to the range track unit. This is accomplished without requiring a redesign of either the computer or range track unit and using a minimum number of components.

An object of the present invention is to provide an undelayed input signal to a fire control system computer.

Another object is to provide an undelayed input signal to a fire control system computer by adding a function already present in the computer to the range track unit.

Another object of the present invention is to provide means to couple a computer designed to accept an undelayed input signal to a radar system range track unit designed as a low pass filter which therefore operates to introduce phase delay into target echo signals.

A further object of the invention is the provision, in a fire control system having a computer which requires an undelayed input signal and a range track unit which has a delayed output signal, of an undelayed output signal thereby making the computer and range track unit compatible.

Other objects and many of the attendant advantages of this invention will be readily appreciated as the same becomes better understood by reference to the following detailed description when considered in connection with the accompanying drawings wherein.

Figure 1:
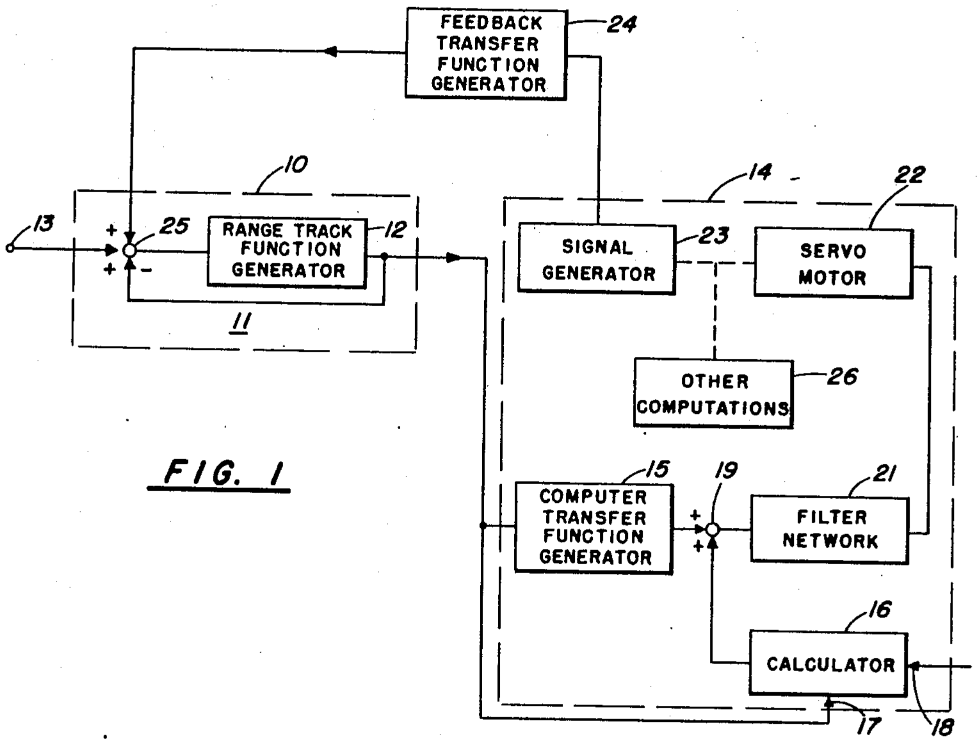
FIG. 1 shows in block diagram form a preferred embodiment of the invention.

Referring now to the drawing, wherein like reference characters designate like or corresponding parts throughout the several views, there is shown in FIG. 1 a radar receiver 10 having a range track loop 11 including the range track function generator 12. Range track loop 11 converts the video signal received at terminal 13 into a voltage proportional to range in a conventional manner insofar as this invention is concerned. The output from receiver 10 is coupled to the inputs of computer 14 which comprises computer transfer function generator 15, calculator 16, adder 19, filter network 21, servo-motor 22 and signal generator 23. The output of range track loop 11 is coupled to the computer transfer function generator 15 and to input 17 of range acceleration calculator 16. Also fed into calculator 16 at input 18 are signals proportional to antenna angular rates and linear acceleration. The output from transfer function generator 15 and calculator 16 are added in the conventional manner in adder 19 and then smoothed by filter network 21 to produce a smoothed range rate output which is fed into the servo-motor 22. Servo-motor 22 is coupled to various loads represented by block 26 supplied by computer 14, for example, command signals to pilot or autopilot, etc. Also coupled to the output of servo-motor 22 is a signal generator 23 shown in detail in FIG. 2. The signal generated by generator 23 is coupled through a feedback transfer function generator 24 to the input of range track loop 11 in adder 25.

Figure 2:
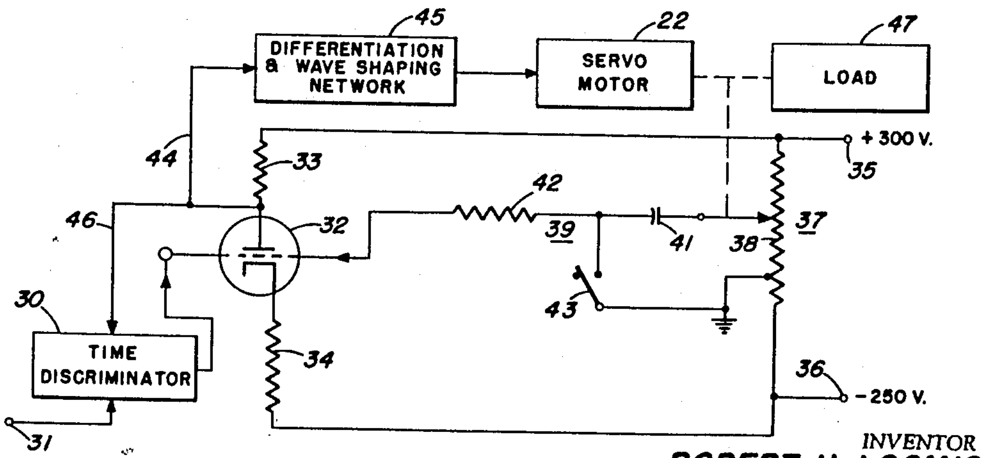
FIG. 2 is a circuit diagram of the invention showing schematically the feedback transfer function generator.

Referring now to FIG. 2, there is shown a time discriminator 30 having a video signal applied to the input thereof from terminal 31. The output from time discriminator 30 is coupled to the control grid of tube 32 which is the first amplifying stage of a bandwidth shaping circuit. The plate of tube 32 is coupled to a source of positive voltage supply terminal 35 through resistor 33. The cathode of tube 32 is coupled to a negative voltage supply terminal 36 through resistor 34. Connected between terminals 35 and 36 is a potentiometer 37 having a wiper arm 38 driven by servo-motor 22. The voltage on the wiper arm 38 is coupled to the control grid of tube 32 through a feedback transfer function generator 39. Function generator 39 consists of capacitor 41 and resistor 42. Connected intermediate capacitor 41 and resistor 42 and ground is switch 43. Switch 43 is closed at long ranges, when the value of range acceleration is small, and in this position the feedback signal is grounded. At short ranges, switch 43 opens, allowing the feedback signal to pass. The output from tube 32 is coupled through lead 44 to differentiation and wave shaping network 45. Tube 32 is also coupled through a feedback circuit 46 to time discriminator 30. In addition to driving potentiometer 37, servo-motor 22 is coupled to other load devices indicated by load 47.

It has been found that the signal to be added to range track loop 11 to eliminate delay from the output signal when the signal generated by function generator 12 is $$\frac{K(1+1.6S)}{S^2}$$

should be $$\frac{K^2S}{1+1.6S}$$

where

K is the gain of generator 12
$K_2$ is the gain of generator 24
S is the signal applied to the input of generator 12

This signal is obtained by differentiating the smoothed range rate output signal from filter network 21 and modifying this differentiated signal by means of potentiometer 37 and transfer function generator 39.

The following equations show that the lag is removed. From the equations mechanized in the computer, it is known that, neglecting target acceleration, the following equation is true:

$$R_S=\frac{SR_0+TS^2R}{1+TS} \quad (1)$$

where $R_S$ is the computer output
S is the signal applied to the input of generator 12
$R_0$ is the output from range track loop 11
T is the time constant of filter network 21
R is the video input signal to the range track loop 11

Looking at adder 25 it is seen that:

(2)

$$R_0=\left[R-R_0+\frac{K_2S^2R_0}{(1+TS)(1+1.6S)}+\frac{K_2TS^3R}{(1+TS)(1+1.6S)}\right]\frac{K_1(1+1.6S)}{S^2}$$

(3)

$$\left[K_1(1+1.6S)+S^2-\frac{K_1K_2S^2}{1+TS}\right]R_0=\left[K_1(1+1.6S)+\frac{K_1K_2TS^3}{1+TS}\right]R$$

If $K_1$ $K_2$ is adjusted to be equal to unity the following equation results:

(4) $$[K_1(1+1.6S)(1+TS)+TS^3]R_0=[K_1(1+1.6S)(1+TS)+TS^3]R$$

(5) $$R_0=R$$

The transfer function shown is used as an example only, obviously many modifications and variations of the present invention are possible in the light of the above teachings. It is therefore to be understood that within the scope of the appended claims the invention may be practiced otherwise than as specifically described.

What is claimed is:

1. In combination: a radar receiver having input means and output means, said radar receiver providing target range signals having phase delay, a computer having input and output means, means coupling said receiver output means to the computer input means, feedback means including transfer function generator means for generating a signal to remove said phase delay; and circuit means coupling said feedback means between said computer output means and said radar input means.

2. The combination according to claim 1 wherein said transfer function generator means comprises a potentiometer having a movable tap driven by a servomotor coupled to the output of said computer, and a resistor and a capacitor connected in series coupled to said movable tap and to said radar input coupling means.

3. In combination: a radar receiver having input means and output means, said radar receiver providing target range signals having phase delay; a computer having input and output means and producing an errorless output signal when an undelayed range signal is applied to said input means, means coupling said receiver output means to the computer input means, feedback means including transfer function generator means for generating a signal to remove said phase delay; and circuit means coupling said feedback means between said computer output means and said radar input means.

4. The combination according to claim 3 wherein said transfer function generator means comprises a potentiometer having a movable tap driven by a servomotor coupled to the output of said computer, and a resistor and a capacitor connected in series coupled to said movable tap and to said radar input coupling means.

5. In combination: radar receiving means for producing an output signal proportional to target range which is delayed with respect to a target echo input signal applied thereto; computer means for generating an output signal and having said delayed signal coupled as an input thereto; feedback means including transfer function generator means for generating a signal to remove said range signal delay, coupling said computer output signal as an input signal to said radar receiver means; said feedback means comprising a potentiometer having a movable tap driven by a servomotor coupled to the output of said computer, said potentiometer being connected across a source of direct current, a triode tube connected across said direct current source, and a resistor and a capacitor connected in series coupling said movable tap to the control grid of said triode.

6. In combination: a radar receiver, a computer and adding means; said radar receiver having a range track loop including a function generator for generating a delayed range signal; said computer having input and output means and producing an errorless output signal when an undelayed range signal is applied to said input means, means coupling said delayed signal to said computer input means; said adding means having input and output means, terminal means connected to said adding input means and adapted to be coupled to a radar range input signal, feedback circuit means coupling said delayed range signal to said adding input means, means coupling said adding output means to the input of said function generator, and transfer function generator means for removing the delay of said signal coupled between the output of said computer and the input of said adding means.

No references cited.